(12) United States Patent
Tanno et al.

(10) Patent No.: US 9,016,339 B2
(45) Date of Patent: Apr. 28, 2015

(54) PNEUMATIC TIRE

(75) Inventors: Atsushi Tanno, Hiratsuka (JP); Masatoshi Kuwajima, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 360 days.

(21) Appl. No.: 13/192,361

(22) Filed: Jul. 27, 2011

(65) Prior Publication Data

US 2012/0024439 A1 Feb. 2, 2012

(30) Foreign Application Priority Data

Jul. 27, 2010 (JP) ................................ 2010-167839

(51) Int. Cl.
*B60C 5/00* (2006.01)
*B60C 5/08* (2006.01)
*B60C 19/00* (2006.01)
*B60C 23/00* (2006.01)
*B60C 23/04* (2006.01)
*B29D 30/00* (2006.01)

(52) U.S. Cl.
CPC ..... *B60C 23/0493* (2013.01); *B29D 2030/0072* (2013.01)

(58) Field of Classification Search
USPC .............................. 152/368, 372; 428/99, 583
IPC ......................................................... B60C 19/00
See application file for complete search history.

(56) References Cited

U.S. PATENT DOCUMENTS

| 363,523 A * | 5/1887 | Kyle .................................. 24/94 |
| 1,057,241 A * | 3/1913 | Hornung ...................... 152/369 |
| 2,509,434 A * | 5/1950 | Huelster .......................... 24/692 |
| 7,881,066 B2 | 2/2011 | Scheungraber et al. |
| 7,900,665 B2 | 3/2011 | Shimura |
| 2009/0173422 A1 | 7/2009 | Utsumi et al. |
| 2010/0018622 A1 | 1/2010 | Tanno et al. |

FOREIGN PATENT DOCUMENTS

| CN | 101326065 | 12/2008 | |
| DE | 10 2006 010 736 | 10/2006 | |
| EP | 2135750 A1 * | 12/2009 | ............... B60C 5/14 |
| JP | 2004-168212 | 6/2004 | |
| JP | 3916625 | 2/2006 | |
| JP | 2008230411 A * | 10/2008 | ............. B60C 19/00 |
| WO | WO03/070496 | 8/2003 | |
| WO | WO 2006/038585 | 4/2006 | |

OTHER PUBLICATIONS

Machine Translation: JP2008-230411A; Uchiumi, Atsuro; No date.*
German Office Action, dated May 28, 2013, 9 pages, Germany.

* cited by examiner

*Primary Examiner* — Justin Fischer
*Assistant Examiner* — Kendra Shin
(74) *Attorney, Agent, or Firm* — Thorpe, North & Western, LLP

(57) ABSTRACT

A pneumatic tire including a separatable pair of mechanical fasteners wherein a first fastener of the pair of mechanical fasteners is provided on a tire inner surface. In this pneumatic tire, the obtained engagement force of the pair of mechanical fasteners is great and is essentially free of variations (positional variation within the tire and variation from tire to tire); the engagement force deteriorates/declines minimally over time due to extreme usage conditions including repetitive deformation and compaction over an extended period of time caused by tire rotation at high speeds in a state of relatively elevated temperatures; and the desired engagement force can be maintained over an extended period of time.

19 Claims, 9 Drawing Sheets

PNEUMATIC TIRE

PRIORITY CLAIM

Priority is claimed to Japan Patent Application Serial No. 2010-167839 filed on Jul. 27, 2010.

BACKGROUND

1. Technical Field

The present technology relates to a pneumatic tire, and particularly to a pneumatic tire in which a method for attaching an object to an inner surface of a pneumatic tire is realized.

2. Related Art

In recent years, various attempts at disposing objects having various functions on an inner circumferential surface of pneumatic tires have been made.

For example, an attaching method has been proposed in which tire tags (radio frequency identification tags), chips, or the like are attached to an inner liner or the like of a green tire using a surface fastener such as a hook and loop fastener, a hook and hook fastener, or the like (Japanese Unexamined Patent Application Publication (translation of PCT application) No. 2005-517581).

Additionally, a pneumatic tire has been proposed in which a surface fastener is vulcanization bonded to a region corresponding to a tread portion of a tire inner surface, and a noise absorbing member is attached to the tire inner surface via the surface fastener (Japanese Patent No. 3916625).

The surface fasteners proposed in Japanese Unexamined Patent Application Publication (translation of PCT application) No. 2005-517581 and Japanese Patent No. 3916625 are preferable in that relatively strong engagement force is realized when attaching, and engagement on a surface can be achieved without slight misalignments when attaching becoming a problem.

However, with the surface fasteners proposed in the prior references, a state in which the individual engaging elements of the surface fastener are engaged is not ideal due to the inner circumferential surface of the pneumatic tire being an annular, curved surface. With the surface fasteners proposed in the prior references, portions of the edges and center portions become raised, and an amount of the obtained engagement force varies (positional variation within the tire and variation from tire to tire). As a result, in some cases the expected engagement force is not obtained.

Additionally, partial physical deterioration and deterioration/declining over time of the engagement force of an entirety of the surface fastener accompanying the progression of the partial physical deterioration occurs as a result of repetitive deformation and compaction over an extended period of time caused by rotation at high speeds in a state of relatively elevated temperatures. This has led to cases in which difficulties have been met in maintaining a desired engagement force over an extended period of time.

SUMMARY

In light of the foregoing, the present technology provides a pneumatic tire in which an object can be attached to an inner surface thereof via engaging, wherein the obtained engagement force thereof is great and is essentially free of variations (positional variation within the tire and variation from tire to tire). The engagement force deteriorates/declines minimally over time due to extreme usage conditions including repetitive deformation and compaction over an extended period of time caused by tire rotation at high speeds in a state of relatively elevated temperatures.

The desired engagement force can also be maintained over an extended period of time.

A pneumatic tire of the present technology that achieves the aforementioned object has the configuration described in (1) below.

(1) A pneumatic tire including a separatable pair of mechanical fasteners wherein a first fastener of the pair of mechanical fasteners is provided on a tire inner surface.

The pneumatic tire according to the present technology preferably is configured as described in any of 2 to 7 below.

(2) The pneumatic tire described in (1), wherein the first fastener includes at least two members, the two members being fixed and forming the first fastener by sandwiching a tire member or a tire reinforcing member.

(3) The pneumatic tire described in (1) or (2), wherein a height of a portion of the first fastener on the tire inner surface that protrudes most from the tire inner surface is from 0 mm to 3.5 mm, and an outer diameter of a portion exposed to the interior of the tire is from 4 mm to 12 mm.

(4) The pneumatic tire described in any of (1) to (3), further including a surface fastener portion on the tire inner surface in addition to the first fastener.

(5) The pneumatic tire described in any of (1) to (4), wherein at least two of the first fasteners on the tire inner surface are provided on the tire inner surface, a placement position thereof in a tire width direction is essentially the same, and the at least two first fasteners are disposed so as to form a single row or a plurality of rows.

(6) The pneumatic tire described in any of (1) to (5), further including an object provided with a second fastener that engages with the first fastener on the tire inner surface, wherein the object is fixed on the tire inner surface by engaging the first fastener with the second fastener.

(7) The pneumatic tire described in (6), wherein the object provided with the second fastener is one or a combination of (a) an electronic circuit including a sensor, (b) balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

With the present technology, a pneumatic tire is provided in which an object can be attached to an inner surface thereof via a mechanical fastener, wherein the obtained engagement force thereof is great and the engagement force is essentially free of variations (positional variation within the tire and variation from tire to tire). Furthermore, with the provided pneumatic tire, the engagement force deteriorates/declines minimally over time due to extreme usage conditions including repetitive deformation and compaction over an extended period of time caused by tire rotation at high speeds in a state of relatively elevated temperatures; and a desired engagement force can be maintained over an extended period of time.

With the present technology, in addition to the effects provided by the technology described above, a pneumatic tire is provided in which the first fastener includes at least two members, the two members being fixed and forming the first fastener by sandwiching a tire member or a tire reinforcing member. Thereby, the fixing is firm, superior durability is obtained, and the desired engagement force can be maintained over an extended period of time.

With the present technology, in addition to the effects provided by the technology described above, a pneumatic tire is provided in which dimensions of the fastener are neither excessively large nor excessively small. Therefore, even when subjected to high pressure loads when vulcanizing the tire, the fastener does not deform or sink into the tire. Additionally, stability is excellent due to the fastener having suitable dimensions, and durability with regards to severe use over extended periods of time is high. As a result, the desired engagement force can be maintained for an even longer period of time.

With the present technology, in addition to the effects provided by the technology described above, a pneumatic tire is provided in which greater and more stable engagement force can be displayed because the engagement force of the surface fastener is combined. Particularly, by engaging the pair of mechanical fasteners, a pneumatic tire can be provided in which the surface fasteners can be automatically engaged at an optimal engagement position as desired, and the maximum effectiveness of the engagement force of both components (the mechanical fasteners and the surface fasteners) can be displayed. Additionally, because surface fasteners are generally inexpensive, using both components can lead to overall costs being reduced while high-precision engagement positioning and high engagement force are realized.

With the present technology, in addition to the effects provided by the technology described above, a pneumatic tire is provided in which greater and more stable engagement force can be displayed due to the engagement force provided by the pair of mechanical fasteners. Particularly, a high degree of effectiveness is displayed when a weight or volume of an object having desired functionality to be attached to a tire inner surface is, to a certain degree, great.

With the present technology, a pneumatic tire is provided in which an object having desired functionality is attached to a tire inner surface while realizing great engagement force and superior durability.

DETAILED DESCRIPTION

A detailed explanation of the pneumatic tire of the present technology will be given below.

Figure 1:
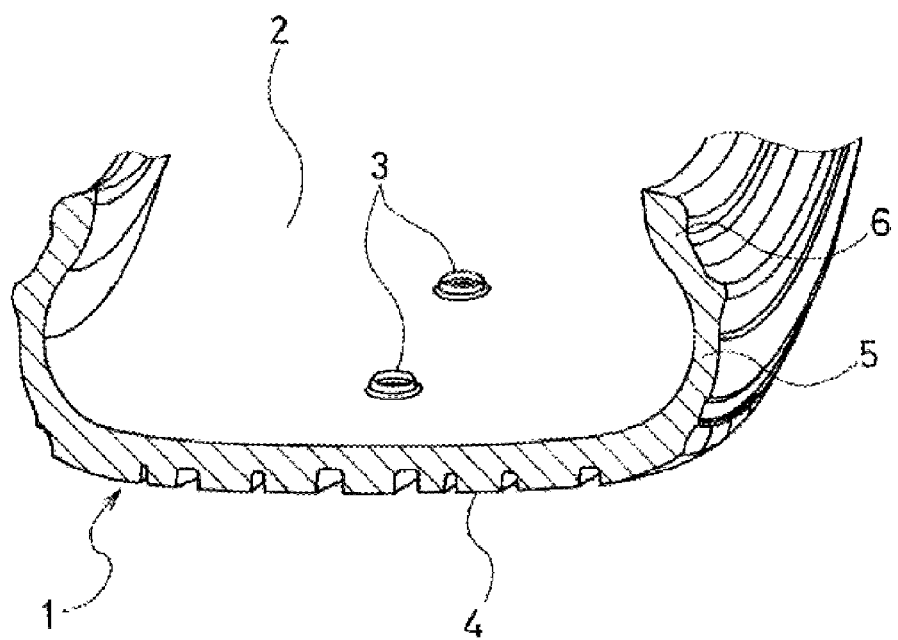
FIG. 1 is a perspective view of a partial cross section illustrating an embodiment of the pneumatic tire of the present technology.

As illustrated in FIG. 1, the pneumatic tire of the present technology has a construction including a separatable pair of mechanical fasteners, wherein a first fastener 3 of the pair of mechanical fasteners is provided on a tire inner surface 2 of a pneumatic tire 1.

Here, "mechanical fastener" refers to a pair of fasteners configured so that two fasteners can be separated and can be mechanically re-engaged, and so that this engaging and separating can be freely repeated.

Exemplary types of such a mechanical fastener are those known as "hooks" or "snaps". Specific examples of products in the clothing industry that are generally included as mechanical fasteners are snap buttons, ring snaps, ring hooks, American snaps, American hooks, eyelet hooks, spring hooks, and jumper hooks. Such mechanical fasteners differ from surface fasteners in that while an area of the engaging part of a surface fastener is unlimited in the entire area, the area of the engaging part of a mechanical fastener is small (e.g. preferably from about 1 to 115 $mm^2$ and more preferably from about 4 to 90 $mm^2$) In other words mechanical fasteners are point fasteners.

In other words, even when engaged at a small area of from about 1 to 115 $mm^2$, due to a mechanical male-female structure or the like, strong engaging is achieved. Thus, a conventional structure for the mechanical fastener may be used. The mechanical fastener can be formed from materials such as metals, synthetic resins, rubbers, and the like.

An object to be attached to an inner surface of the pneumatic tire is attached by engaging via the pair of mechanical fasteners. Therefore, the mechanically obtained engagement force is great and the size of the engagement force is essentially free of variations (positional variation within the tire and variation from tire to tire). Furthermore, the engagement force deteriorates/declines minimally over time due to extreme usage conditions including repetitive deformation and compaction over an extended period of time caused by tire rotation at high speeds in a state of relatively elevated temperatures. As a result, the desired engagement force can be maintained over an extended period of time and, by extension, the functionality of the object attached to the inner side of the pneumatic tire can be displayed over an extended period of time.

Moreover, positioning of an engagement position (point of engagement) of the object to be attached to the tire inner surface is performed automatically and precisely. Therefore, it is possible to easily accommodate cases where a high level of precision is required. This is of great significance because positioning is performed on the tire inner surface, a narrow, curved, surface in three-dimensional space. Additionally, compared to surface fasteners, mechanical fasteners have great engagement force and this engagement force deteriorates/declines minimally over time, and thus, the engaged state can be maintained precisely and firmly over an extended period of time.

Figure 2A:
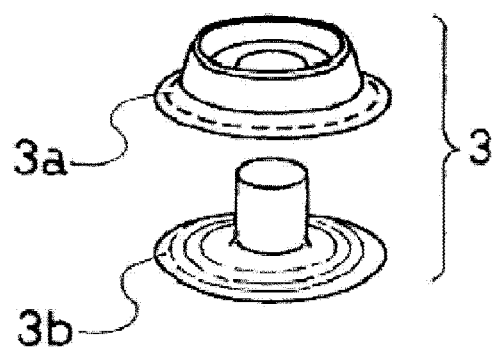
FIGS. 2A and 2B are explanatory drawings illustrating an exemplary shape of a first fastener of a separatable pair of mechanical fasteners used in the pneumatic tire of the present technology; and are perspective model drawings of an appearance thereof illustrating that the fastener is formed from two members.
Figure 2B:
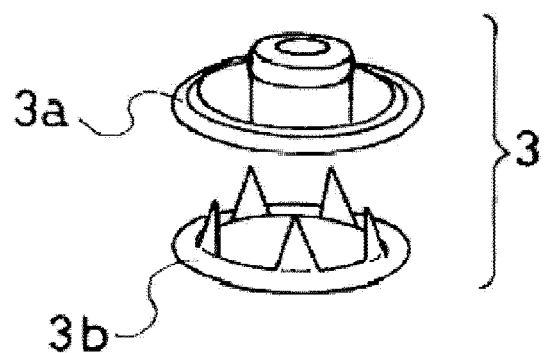

In the present technology, the first fastener 3 is formed from at least two members, and these two members are fixed and form the first fastener 3 by sandwiching a tire member or a tire reinforcing member. FIGS. 2A and 2B are explanatory drawings illustrating an exemplary shape of the first fastener 3; and are model drawings illustrating that the first fastener 3 is formed from two members 3a and 3b.

Figure 3:
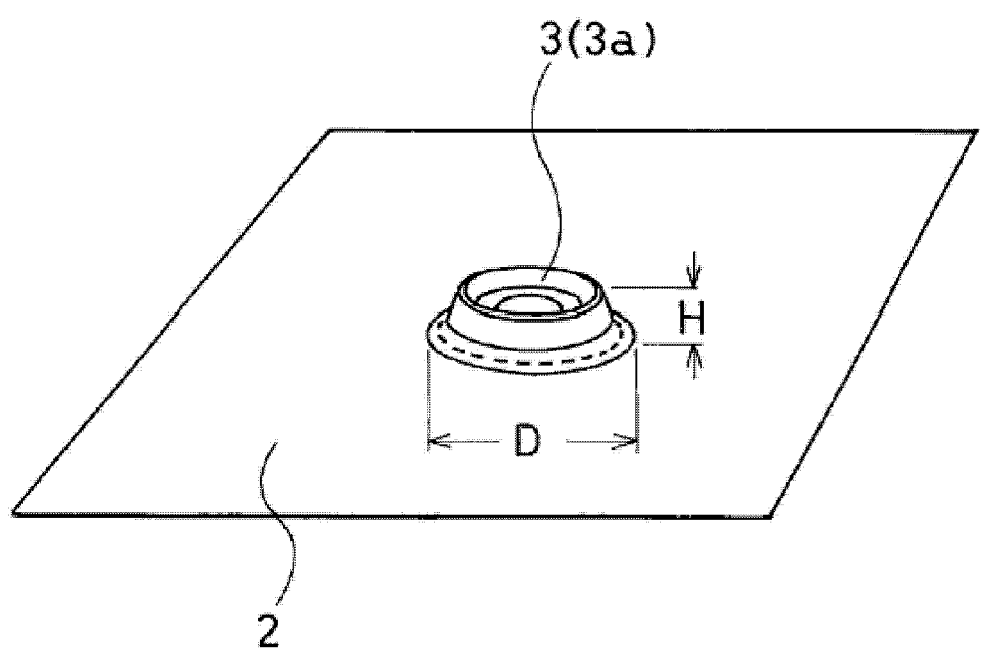
FIG. 3 is a magnified view of main components illustrating an embodiment of the pneumatic tire of the present technology.

The two members 3a and 3b are fixed integrally and form the first fastener 3 of the pair of mechanical fasteners. As illustrated in FIG. 3, primarily the member 3a is exposed on the tire inner surface 2.

The fastener 3 provided on the tire inner surface 2 is bonded to the tire inner surface by vulcanization bonding, which is preferable because a bonding strength thereof is great. Additionally, a portion of the fastener 3 is bonded by being configured so as to be embedded in the rubber of the tire inner surface, which is preferable because superior durability will be obtained.

A height H of a portion of the fastener 3 that protrudes most from the tire inner surface is from 0 mm to 3.5 mm, and an outer diameter D of a portion exposed to the interior of the tire is from 4 mm to 12 mm. The height H of the portion that protrudes most from the tire inner surface and the outer diameter D of the portion exposed to the interior of the tire are as illustrated in the models of FIGS. 3A to 3C. It is not preferable that the height H exceed 3.5 mm because the pressure generated at tire vulcanization may cause the member 3a or the member 3b of the fastener to press on and deform the carcass and/or the belt structure. Additionally, it is not preferable that the outer diameter D be less than 4 mm because, at tire vulcanization, an angle with respect to the tire inner surface will not be stable and difficulties will be encountered in parallelly disposing a bottom of the fastener 3 on the tire inner circumferential surface. It is not preferable that the outer diameter D exceed 12 mm because difficulties will be encountered in following the deformation/recovery of the tire inner surface when the tire is rolling, and breakdowns will be more apt to occur. It is preferable that, when a fastener 3 with such dimensions is used, a metal or synthetic resin material (e.g. preferably nylon or polyester) be used as a material thereof because molding and processing will be facilitated.

Figure 4A:
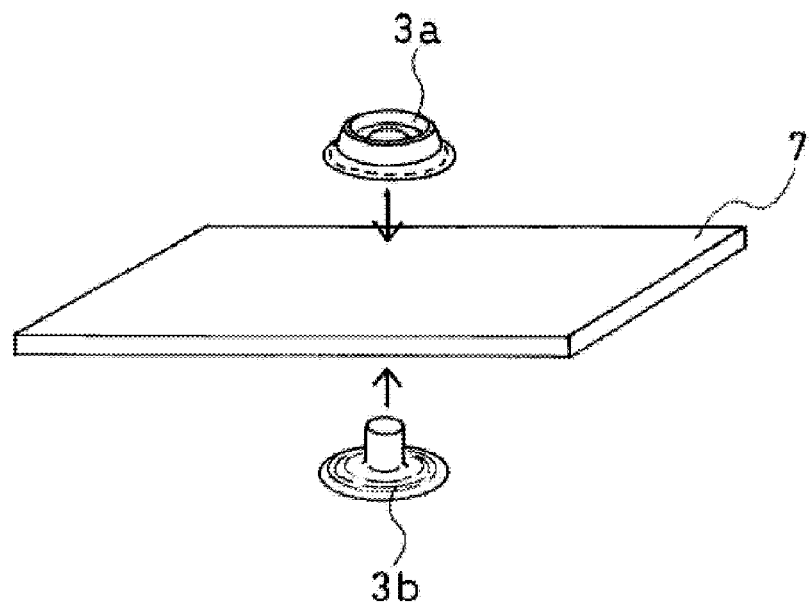
FIGS. 4A and 4B are magnified views of main components illustrating an embodiment of the pneumatic tire of the present technology. Each of the magnified views of main components illustrates a state where the first fastener includes the two members illustrated in FIGS. 2A and 2B, and the two members fix and form the first fastener by sandwiching a tire member or a tire reinforcing member.
Figure 4B:
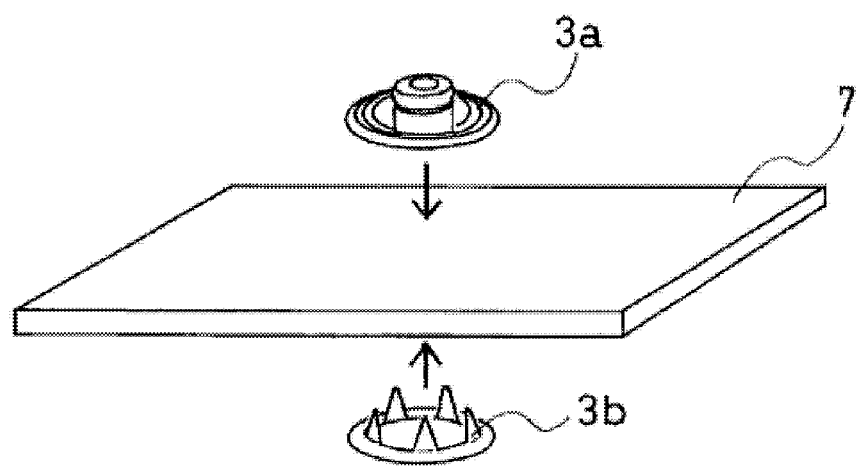

As illustrated in FIGS. 4A and 4B, it is preferable that the fastener 3 is formed by integrating the member 3a or 3b of the fastener with the other member 3b or 3a of the fastener so as to sandwich the tire member or tire reinforcing member 7, because this will lead to the fastener 3 being firmly fixed on the tire inner surface. Here, "tire member" refers to a component of the tire made from rubber, resin, or the like, and specifically refers to an inner liner, a carcass, or the like. Alternatively, a rubber layer exclusively for being sandwiched by the member 3a or the member 3b of the fastener, a rubberized reinforcing fiber layer or resin layer, or a plurality of laminated layers thereof may be provided on the tire inner surface. Such a configuration is preferable because, generally, air shutoff performance in the tire is enhanced.

Figure 5:
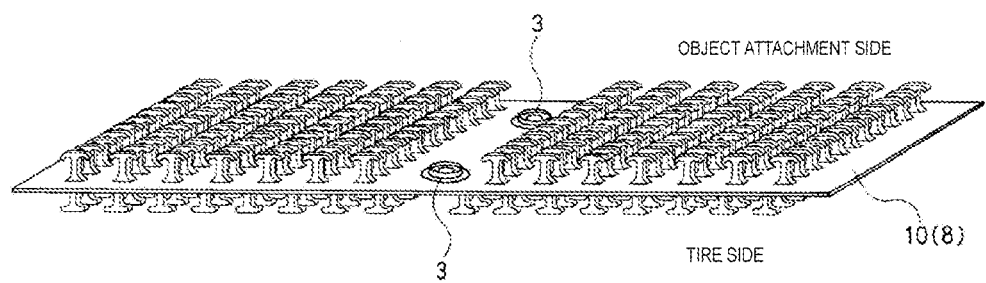
FIG. 5 is a magnified view of main components illustrating an embodiment of the pneumatic tire of the present technology, particularly an example in which a double-sided fastening member is used as means for attaching a mechanical fastener to a tire inner surface or, alternatively, an example in which an object attached to the pneumatic tire of the present technology is a double-sided fastening member.

Additionally, the pneumatic tire of the present technology preferably includes a surface fastener portion in addition to the fastener 3 of the mechanical fastener. Such a configuration is illustrated in FIG. 5.

The fastener 3 is disposed on a portion of a surface of the surface fastener member 10. The surface fastener member 10 is a double-sided fastener and has engaging elements of the surface fastener on both surfaces (the tire side and the object side). In an example of a use, the surface fastener member 10 is engaged with the surface fastener disposed on the tire inner surface. Thereby, a tire inner surface having a fastener 3 can be formed. Moreover, a desired object (not illustrated in FIG. 5 and depicted as 8 in FIG. 7) can be attached to the tire inner surface via the engaging elements on the object attaching side of the fastener 3 and the surface fastener. Alternatively, in another example of a use (conceptualization), if the fastener 3 is pre-formed on the tire inner surface, the surface fastener member 10 itself can be considered to be the object to be attached on the tire inner surface, and can be attached on tire inner surface using the fastener 3 on the surface fastener member 10. In this case, the engaging element of the surface fastener on the tire side need not be provided, rather, provision of such may be determined based on the existence of the engaging element of the surface fastener on the tire inner surface side. When positioning such a surface fastener member 10 itself with the object to be attached on the tire inner surface, the object is interposed therebetween. Therefore, the desired object having a specific functionality is configured so as to have a surface fastener and, if necessary, may be configured so as to be attached using the first fastener of the mechanical fastener.

In both cases, when exercising the engaging functionality of both the mechanical fastener and the surface fastener on both sides, by precisely engaging paired fasteners, it becomes possible to automatically engage the surface fasteners at an optimal engagement position at the same time. This is superior because a high degree of overall precision with regards to the engagement position can be realized and the maximum effectiveness of the engagement force (magnitude and durability) of both components can be displayed. Additionally, because surface fasteners are inexpensive, overall costs can be reduced while high-precision engagement positioning and high engagement force are realized.

Figure 6A:
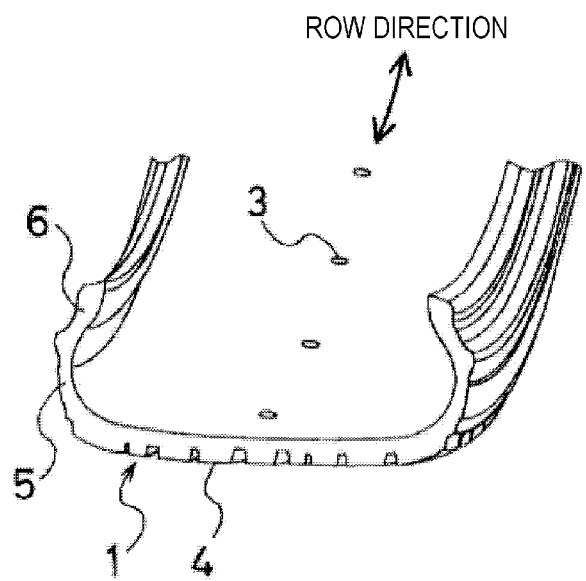
FIGS. 6A to 6D are perspective views of a partial cross section illustrating various arrangement examples of a first mechanical fastener as an embodiment of the pneumatic tire of the present technology.
Figure 6B:
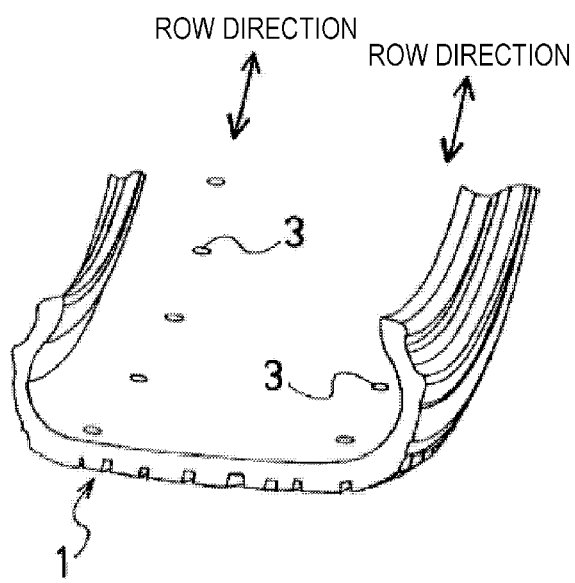
Figure 6C:
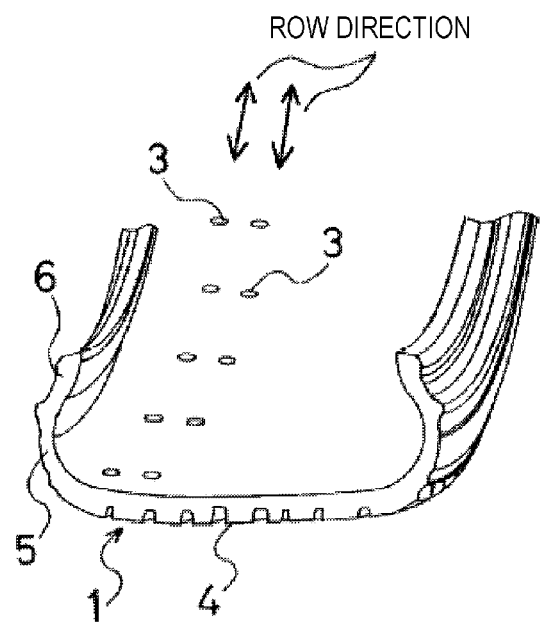
Figure 6D:
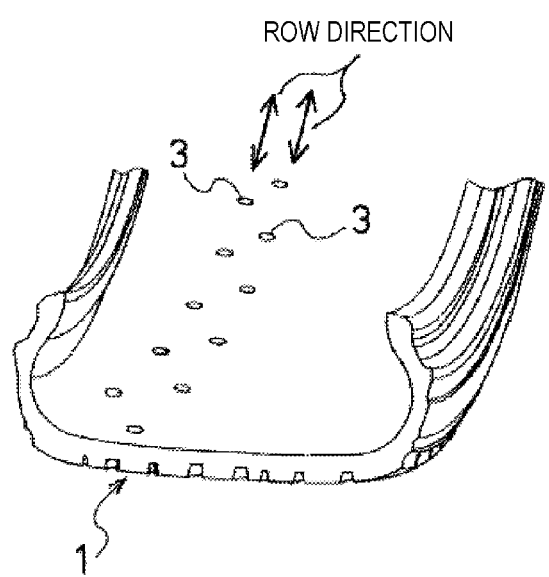

Additionally, in the present technology, preferably at least two of the fasteners 3 are disposed on the tire inner surface, a placement position in the tire width direction is essentially the same, and the at least two fasteners 3 are disposed so as to form a single row or a plurality of rows. Exemplary forms thereof are illustrated in FIGS. 6A to 6D. FIG. 6A is an example wherein there is one row in a center; FIG. 6B is an example wherein one row is provided in the vicinity of a tread edge on both left and right sides; FIG. 6C is an example wherein two rows are provided juxtaposed in the vicinity of one tread edge; and FIG. 6D is an example wherein two rows are provided offset so as to be in a staggered arrangement in the vicinity of one tread edge.

As illustrated in theses drawings, the number of rows may be set as desired. Additionally, it is sufficient that a region where the fasteners 3 are disposed is on the tire inner surface. Depending on the functionality of the object to be attached, the fasteners 3 may be provided in a region corresponding to a tread portion 4, a region corresponding to a side wall portion 5, or a region corresponding to a bead portion 6. According to the observations of the present inventors, it is preferable that two or more of the rows formed by the fasteners 3 are provided, and practical and preferable that the disposal region is the region corresponding to the tread portion or the region corresponding to the bead portion.

When the fasteners 3 are provided so as to form two or more rows, an interval between the rows is preferably not more than 150 mm and not less than about 20 mm to 30 mm. However, the preferable size of the interval between the rows, pitch, number of rows, and the like may be changed depending on the attributes of the object having the desired functionality to be attached to the tire inner surface.

Note that, when disposing the fasteners 3 on a tire inner surface of a tire having a low aspect size such as an aspect ratio of 45 or lower, the placement position of the fasteners 3 is preferably in a region other than in the vicinity of the tread center (tire equator). If the fasteners 3 are disposed in the vicinity of the tread center (tire equator) and the object is attached at that position, when completely fitting the tire on the wheel at a final stage of rim assembly, there will be a high possibility that a flange portion of the wheel will interfere with the object. Thus, in order to avoid such a situation, from the perspective of actual rim assembly labor, disposing the fasteners 3 on only one side of the tread edge is preferable.

According to the observations of the present inventors, the fasteners 3 are preferably disposed in at least four locations (e.g. 90° intervals) on a periphery in the tire circumferential direction. The fasteners 3 are most preferably disposed continuously throughout an entire circumference at an interval that is less than 90°. In this case, it is more preferable that the fasteners 3 be disposed having an equal interval.

If the fastener is attached via vulcanization, in order to prevent damage to a bladder, a cover is preferably applied to the protruding portion of the fastener prior to vulcanization being performed. The cover may be the second fastener of the pair that engages with the first fastener.

Additionally, as described above, the mechanical fastener 3 may be configured so as to be disposed on the tire side as either of a pair of a recess and a protrusion, or a female form and a male form. Alternatively, the mechanical fastener 3 may be disposed so that a combination of both parts of the pair is present.

Figure 7A:
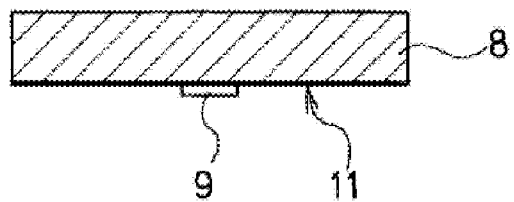
FIGS. 7A to 7D are schematic cross-sectional views illustrating the object attached to the pneumatic tire of the present technology.
Figure 7B:
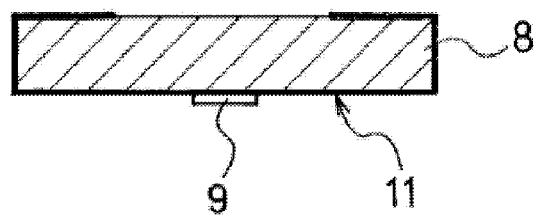
Figure 7C:
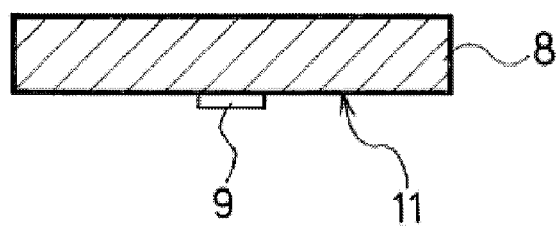
Figure 7D:
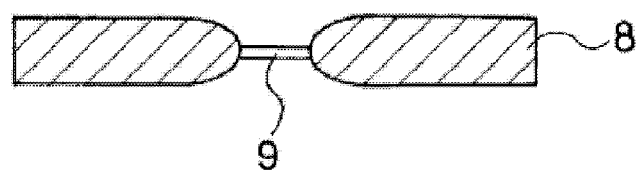

FIGS. 7A to 7D illustrate various examples of a preferable structure of an object 8 to be attached. The object 8 can be formed by attaching or covering the object 8 with a sheet material 11 (e.g. fabric, film, rubber sheet, etc.) on which a second fastener 9 of the pair of mechanical fasteners has been pre-disposed (FIGS. 7A to 7C). FIG. 7A illustrates an example wherein only a tire side surface of the object 8 is covered with the sheet material 11; FIG. 7B illustrates an example wherein all of the object 8, except a portion of a surface on a side opposite the tire, is covered with the sheet material 11; and FIG. 7C is an example wherein all of the object 8 is covered with the sheet material 11. When, for example, an entirety of the object 8 is soft, like a sponge, the fastener 9 may be disposed so as to sandwich a top surface and a bottom surface of the object. Such a form is illustrated in FIG. 7D and the sheet material 11 may be omitted or used as desired. The sheet material 11 is preferably a fabric, a film, a rubber sheet, or the like having suitable flexibility.

The object 8 may be selected based on desired functionality and is not particularly limited, but preferable examples thereof include one or a combination of (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member. Particularly, there has been a strong demand in recent years for noise absorbing members formed from elastic porous materials such as sponges, synthetic resin foams, or the like that reduce tire-generated noise. Therefore, such a noise absorbing member is preferable as the object for use in the present technology. Additionally, there is a demand for surface fastener members as well and, moreover, surface fastener members can function as an interposed body for advantageously attaching other objects. Therefore, such a surface fastener member is useful and preferable as the object for use in the present technology.

Examples of combinations from which specific functionality can be expected particularly include combinations of (1) a balance weight and a noise absorbing member, (2) a noise absorbing member and a ultraviolet light detecting material, (3) a noise absorbing member and a drying agent, (4) a electronic circuit and a drying agent, and the like. In other words, using a first object and a second object in combination wherein the second object functions advantageously to enable the first object to stably display certain functionality over an extended period of time is particularly advantageous.

WORKING EXAMPLES

Hereinafter, specific configurations and effects of the present technology will be described using a Working Example and a Comparative Example.

Working Example 1 and Comparative Example 1

Figure 8A:
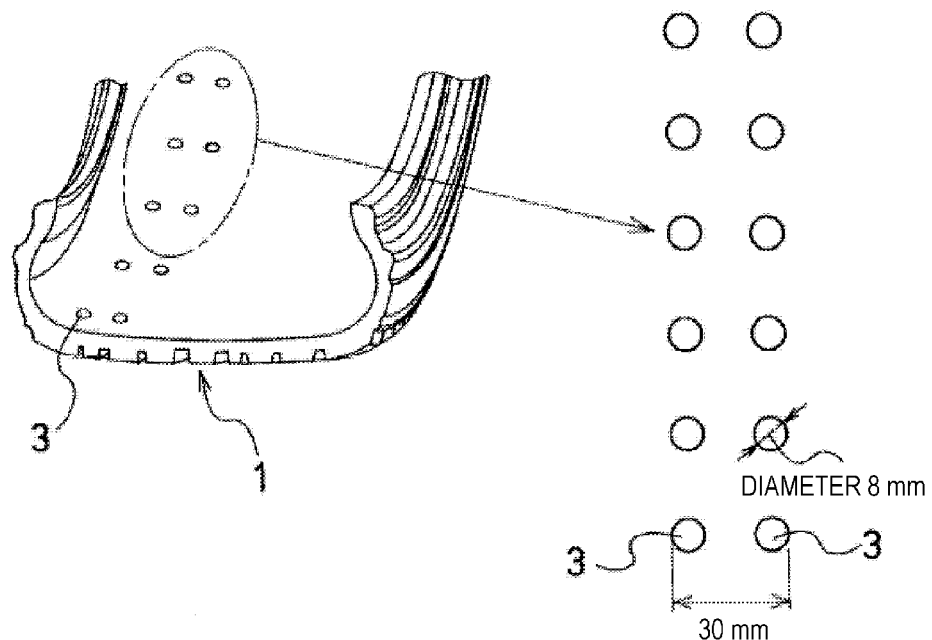
FIG. 8A is a perspective view of a partial cross section illustrating a configuration used in the Working Example of the pneumatic tire of the present technology.
Figure 8B:
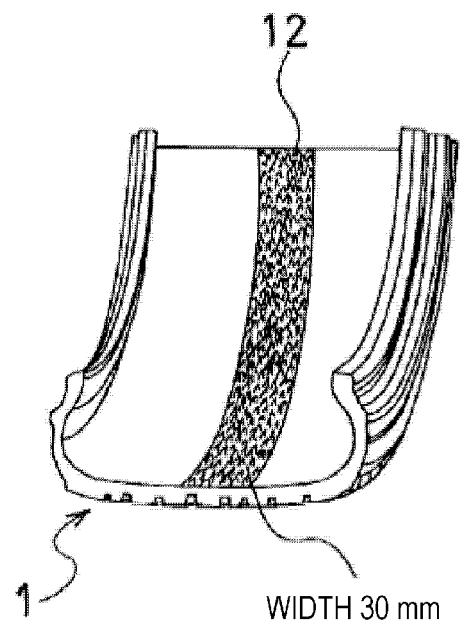
FIG. 8B is a perspective views of a partial cross section illustrating a configuration used in the Comparative Example.

An object was engaged to each of a pneumatic tire of Working Example 1 of the present technology having the form illustrated in FIG. 8A, and a pneumatic tire of Comparative Example 1 illustrated in FIG. 8B. Then, each of these pneumatic tires were tested and compared for engagement force and durability.

In the pneumatic tire of Working Example 1, two juxtaposed rows of the first fasteners 3 (protruding; one-sided metal hook members; diameter at area of maximum diameter in the engaging location/protruding portion=8 mm; area of the engaging portion: 33 mm$^2$) were provided throughout an entire circumference in the vicinity of only one of the tread edges at an equal pitch (50 mm). A distance in the width direction from one edge of the two rows of fasteners to the other edge was 30 mm. A diameter D of an exposed portion of the fasteners was 8 mm, and a protruding height H was 2.5 mm. The fasteners were bonded via vulcanization bonding.

In the pneumatic tire of Comparative Example 1, a tape-like surface fastener 12 (hook material) having a width of 30 mm was bonded via vulcanization bonding to a tire center portion throughout an entire circumference of the tire inner surface.

The object attached to each tire was a noise absorbing member (polyurethane resin foam) having a width of 100 mm and a thickness of 20 mm.

Specifically, an object wherein two juxtaposed rows of fasteners (recessed; one-sided metal hook members) were provided throughout an entire circumference at an equal pitch (50 mm), and having a distance in the width direction from one edge of the two rows of fasteners to the other edge of 30 mm was used as the object to be attached to the tire of Working Example 1.

An object provided with a tape-like surface fastener (loop material) throughout an entire circumference and having a width of 30 mm was used as the object to be attached to the tire of the Comparative Example 1.

In both cases, an entirety of the noise absorbing member (polyurethane resin foam) was covered by a woven fabric, and the fastener (recess) was set so as to sandwich the woven material or, alternately, the surface fastener (loop material) was attached to the woven material using an adhesive.

The noise absorbing member was engaged and attached to the tire inner surface of each of the test tires according to the engaging methods described above. Thereafter, a test in which the noise absorbing member was pulled off was performed 50 times.

A degree of engagement force when pulling off the noise absorbing member was measured as resistance and then was compared with a level of deterioration of engaging force after pulling off 1 time, 10 times, and 50 times.

The pulling off was performed in accordance with Japanese Industrial Standard (JIS) L3416. Peeling force (g/cm)

was measured when peeling off the noise absorbing member at an angle of 90° and that value was indexed and comparatively evaluated.

Results are shown in Table 1. According to the present technology, compared with the pneumatic tire of Comparative Example 1, it is clear that the pneumatic tire of Working Example 1 displayed a greater absolute value of engagement force and much less deterioration.

TABLE 1

|  |  | Engagement Force | | |
| --- | --- | --- | --- | --- |
|  |  | 1 time | 10 times | 50 times |
| Working Example 1 | Mechanical fastener | 142 | 140 | 140 |
| Comparative Example 1 | Surface fastener | 100 | 90 | 87 |

What is claimed is:

1. A pneumatic tire comprising a separatable pair of mechanical fasteners, wherein
   a first fastener of the pair of mechanical fasteners is provided on a tire inner surface;
   the first fastener comprises at least two members, the two members being fixed and forming the first fastener by sandwiching a tire member, the tire member being selected from the group consisting of: an inner liner, a carcass, or a tire inner surface layer on an inner surface of the tire and formed as a rubberized reinforcing fiber layer or a resin layer or a plurality of laminated layers, wherein at least one of the two members extends through the tire member to mechanically engage another one of the two members, the two members being formed of a different material than the tire member; and
   the pair of mechanical fasteners includes a snap button, or a ring snap.

2. The pneumatic tire according to claim 1, wherein a height of a portion of the first fastener on the tire inner surface that protrudes most from the tire inner surface is from 0 mm to 3 mm, and an outer diameter of a portion exposed to the interior of the tire is from 4 mm to 12 mm.

3. The pneumatic tire according to claim 1, further comprising a surface fastener portion on the tire inner surface, in addition to the first fastener.

4. The pneumatic tire according to claim 1, wherein at least two of the first fasteners on the tire inner surface are provided on the tire inner surface, a placement position thereof in a tire width direction is essentially the same, and the at least two first fasteners are disposed so as to form a single row or a plurality of rows.

5. The pneumatic tire according to claim 1, further comprising an object provided with a second fastener that engages with the first fastener on the tire inner surface, wherein the object is fixed on the tire inner surface by engaging the first fastener with the second fastener.

6. The pneumatic tire according to claim 5, wherein the object provided with the second fastener is one or a combination of (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

7. The pneumatic tire according to claim 1, wherein an area of an engaging part of the pair of mechanical fasteners is from about 1 to 115 mm$^2$.

8. The pneumatic tire according to claim 1, wherein an area of an engaging part of the pair of mechanical fasteners is from about 4 to 90 mm$^2$.

9. The pneumatic tire according to claim 1, wherein the first fastener is bonded to the tire inner surface by vulcanization bonding.

10. The pneumatic tire according to claim 9, wherein a portion of the first fastener is embedded in the rubber of the tire inner surface.

11. The pneumatic tire according to claim 1, wherein the mechanical fasteners are snap buttons.

12. The pneumatic tire according to claim 1, wherein the mechanical fasteners are formed from a metal or synthetic resin material.

13. The pneumatic tire according to claim 12, wherein the mechanical fasteners are formed from the synthetic resin material, the synthetic resin material being selected from the group consisting of nylon and polyester.

14. The pneumatic tire according to claim 1, wherein the pneumatic tire comprises a layer exclusively for being sandwiched by the two members.

15. The pneumatic tire according to claim 14, wherein the layer comprises the rubberized reinforcing fiber layer or the resin layer or the plurality of laminated layers.

16. The pneumatic tire according to claim 1, further comprising a surface fastener portion on the tire inner surface, in addition to the first fastener, wherein the surface fastener portion comprises a double-sided fastener with engaging elements on a tire side and an object side of the surface fastener.

17. The pneumatic tire according to claim 1, wherein the first fastener is pre-formed on the tire inner surface.

18. The pneumatic tire according to claim 1, wherein at least two of the first fasteners on the tire inner surface are provided on the tire inner surface, a placement position thereof in a tire width direction is essentially the same, and the at least two first fasteners are disposed so as to form a single row or a plurality of rows, and wherein an interval between the rows is not more than 150 mm and not less than about 20 mm.

19. The pneumatic tire according to claim 1, wherein the pneumatic tire has an aspect ratio of 45 or lower and the pair of fasteners are disposed on a side of a tread edge.

* * * * *